(12) United States Patent
Cheng et al.

(10) Patent No.: US 9,754,617 B2
(45) Date of Patent: Sep. 5, 2017

(54) LASER DIODE UNIT WITH ENHANCED THERMAL CONDUCTION TO SLIDER

(71) Applicant: Seagate Technology LLC, Cupertino, CA (US)

(72) Inventors: Yuhang Cheng, Edina, MN (US); Scott Franzen, Savage, MN (US); Zoran Jandric, St. Louis Park, MN (US); James Gary Wessel, Savage, MN (US); Ning Shi, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 15 days.

(21) Appl. No.: 14/626,688

(22) Filed: Feb. 23, 2015

(65) Prior Publication Data

US 2016/0247527 A1 Aug. 25, 2016

(51) Int. Cl.
*G11B 7/125* (2012.01)
*G11B 11/00* (2006.01)
*G11B 5/31* (2006.01)
*G11B 5/60* (2006.01)
*G11B 5/48* (2006.01)
(Continued)

(52) U.S. Cl.
CPC ............ *G11B 5/6088* (2013.01); *G11B 5/105* (2013.01); *G11B 5/314* (2013.01); *G11B 5/4826* (2013.01); *G11B 2005/0021* (2013.01)

(58) Field of Classification Search
CPC ................ B23K 1/0016; B23K 1/0056; B23K 2201/42; B23K 26/0604; B23K 26/0622; B23K 26/0648; B23K 26/073; G11B 2005/0021; G11B 5/314; G11B 5/6088; G11B 2005/001; G11B 5/40; G11B 5/4826; G11B 5/486; G11B 5/4866; G11B 5/6082; G11B 5/105; G11B 7/125; G11B 7/22; G11B 5/4833; G11B 5/4853; G02B 1/116; G02B 6/4203; G21K 1/00; H01S 5/02236; H01S 5/02272; H01S 2304/02; H01S 2304/04; H01S 5/0425; H01S 5/2202; H01S 5/223; H01S 5/2231; H01S 5/3211; H01S 5/34313; H05K 3/3421; H05K 29/49144; H05K 1/056; H05K 2201/09054; H05K 2201/09554; H05K 2201/09736; H05K 2201/10727; H05K 2201/2036; H05K 2203/041; H05K 3/243; H05K 3/303;
(Continued)

(56) References Cited

U.S. PATENT DOCUMENTS

6,690,547 B2  2/2004  Wada et al.
7,593,189 B2  9/2009  Thurn
(Continued)

*Primary Examiner* — Dionne H Pendleton
(74) *Attorney, Agent, or Firm* — Hollingsworth Davis, LLC (57) ABSTRACT

An apparatus comprises a slider having a trailing edge and a leading edge. A laser diode unit comprises a submount and a laser diode mounted to the submount. The submount includes a mounting surface affixed to a first surface of the slider at the trailing edge such that a first surface of the submount faces toward the leading edge of the slider. A thermally conductive material covers the first surface of the submount and at least a portion of the first surface of the slider. The thermally conductive material serves as a thermal conduction pathway between the submount and the slider.

21 Claims, 9 Drawing Sheets

(51) Int. Cl.
*G11B 5/105* (2006.01)
*G11B 5/00* (2006.01)

(58) Field of Classification Search
CPC ............ H05K 3/3442; Y10T 29/49144; Y10T 29/49826; Y02P 70/613
IPC .................................................... Y02P 70/613
See application file for complete search history.

(56) References Cited

U.S. PATENT DOCUMENTS

| | | | |
|---|---|---|---|
| 7,876,646 B2 | 1/2011 | Tanaka et al. | |
| 8,107,326 B1 | 1/2012 | Hirano et al. | |
| 8,203,804 B2 | 6/2012 | Taguchi et al. | |
| 8,259,540 B1 | 9/2012 | Sahoo et al. | |
| 8,456,965 B2 | 6/2013 | Naniwa et al. | |
| 8,854,932 B2 | 10/2014 | Isoshima | |
| 9,025,423 B1* | 5/2015 | Naniwa | G11B 5/105 369/13.13 |
| 2006/0087768 A1* | 4/2006 | Erpelding | G11B 5/4853 360/234.5 |
| 2008/0239577 A1* | 10/2008 | Zeng | G11B 5/4826 360/245.1 |
| 2010/0148041 A1* | 6/2010 | Takamatsu | G02B 6/4203 250/227.24 |
| 2013/0128388 A1* | 5/2013 | Ajioka | G11B 5/4833 360/245.2 |
| 2013/0168370 A1* | 7/2013 | Kavosh | B23K 1/0016 219/121.62 |
| 2013/0270232 A1* | 10/2013 | Shimazawa | H05K 3/3421 219/121.63 |
| 2014/0104996 A1* | 4/2014 | Tsuchiyama | G11B 5/4826 369/13.17 |
| 2014/0286147 A1* | 9/2014 | Aoki | G21K 1/00 369/13.17 |
| 2015/0154988 A1* | 6/2015 | Takei | G11B 5/6088 369/13.14 |
| 2016/0300592 A1* | 10/2016 | Kawakami | G11B 5/314 |

* cited by examiner

LASER DIODE UNIT WITH ENHANCED THERMAL CONDUCTION TO SLIDER

SUMMARY

Embodiments are directed to an apparatus comprising a slider having a trailing edge and a leading edge. A laser diode unit comprises a submount and a laser diode mounted to the submount. The submount includes a mounting surface affixed to a first surface of the slider at the trailing edge such that a first surface of the submount faces toward the leading edge of the slider. A thermally conductive material covers the first surface of the submount and at least a portion of the first surface of the slider. The thermally conductive material serves as a thermal conduction pathway between the submount and the slider.

Other embodiments are directed to an apparatus comprising a submount configured to be soldered to a slider. The submount has a polygonal shape with exterior surfaces including a mounting surface configured to be attached to the slider via a solder connection. A laser diode is mounted on a first surface of the submount. Thermally conductive material covers a plurality of the surfaces of the submount including the mounting surface. The thermally conductive material covering the mounting surface of the submount serves as a wetting layer for the solder connection.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure is generally directed to sliders used in magnetic recording devices such as hard drives. In particular, this disclosure relates to sliders implemented for heat-assisted magnetic recording (HAMR), also referred to as thermally assisted magnetic recording (TAMR), which can be used to increase areal data density of magnetic media. Generally, a HAMR read-write head includes electromagnetic components similar to a conventional magnetic hard drive read/write head (often referred to generally as a slider), such as a writer and a reader. A HAMR read/write head also includes a source of energy (e.g., a laser) used for heating a small spot on a magnetic media (e.g., disk). The laser energy is used to excite a near-field transducer near the magnetic writer to create a precisely focused thermal spot on the magnetic media. A HAMR device uses a magnetic storage media with higher coercivity than conventional magnetic media, and the hotspot temporarily lowers the coercivity so that data can be written to the heated area. This generally allows for higher areal density to be achieved than with current magnetic recording technologies.

Figure 1:
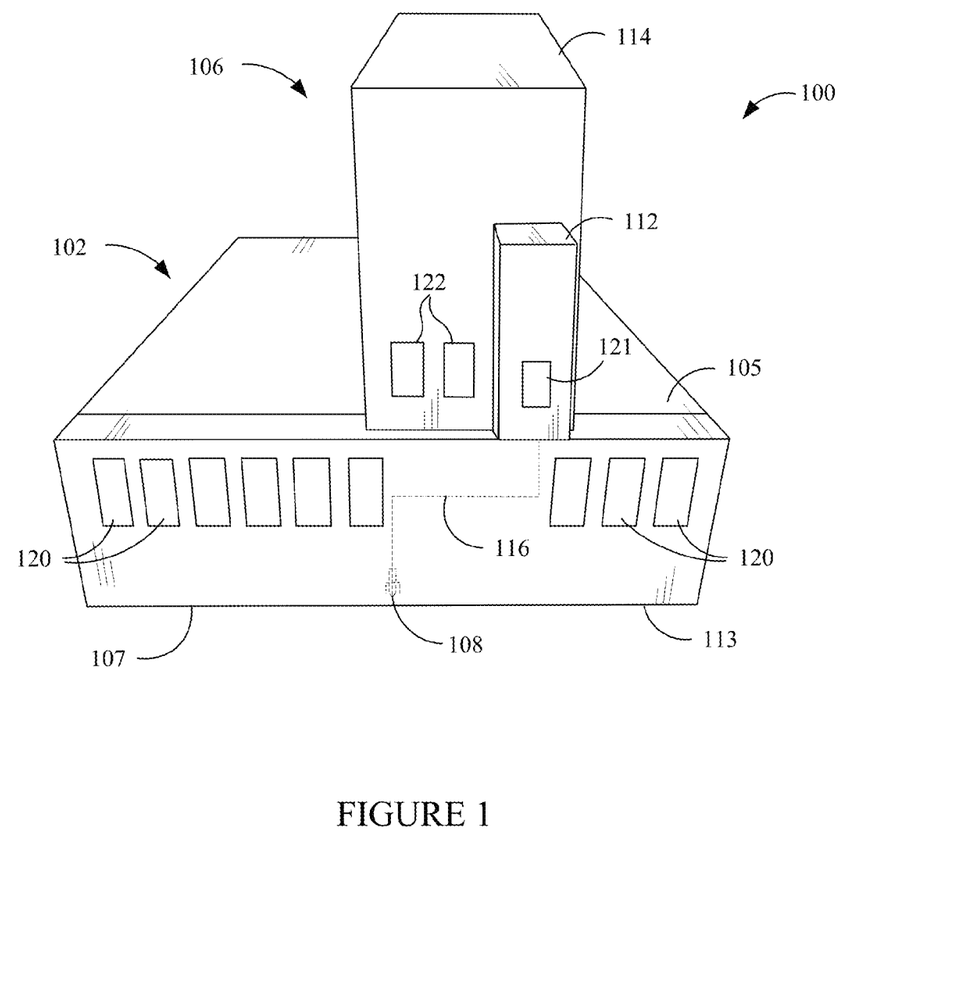
FIG. 1 is a perspective view of a hard drive slider that includes a laser diode unit mounted thereon in accordance with various embodiments.

In a number of existing HAMR designs, a laser is manufactured separately from the slider that houses the read/write head. The laser can be physically attached to the slider, or attached elsewhere and optically coupled to the slider (e.g., via an optic fiber). The present disclosure relates to one example of the former arrangement, referred to herein as laser-on-slider (LOS). In FIG. 1, a perspective view shows an LOS assembly 100 according to a representative embodiment.

The slider assembly 100 includes a slider body 102 having a media-facing surface 113 and a top surface 105. The media-facing surface 113 faces a magnetic media surface (e.g., disk surface, not shown) during operation. A read/write head region 108 is located at the media-facing surface 113 near a trailing edge 107 of the slider body. The read/write head region 108 includes respective one or more read transducers and write transducers, as well as an optical component (e.g., a near-field transducer) that directs a small beam of energy onto the media surface. The read/write head region 108 generally includes an alumina overcoat. The energy is provided by a laser diode 112 attached to a submount 114, both of which are attached to the top surface 105 of the slider body 102. The laser diode 112 mounted to the submount 114 is referred to herein as a laser diode unit 106 (LDU).

The laser diode 112 of the LDU 106 directs light to an optical interface (not shown) of the slider body 102, where it is coupled to a waveguide 116 that directs light to the read/write head region 108. The laser diode 112 in this example is an edge-emitting laser diode, and may be coupled to the waveguide 116 via a facet, grating, lens or other coupling structure known in the art. Generally, the slider body 102 is an integrated optics device that is formed together with the waveguide 116 and read/write head region 108.

The field of integrated optics relates to the construction of optics devices on substrates, sometimes in combination with electronic components, to produce functional systems or subsystems. The processes used are similar to those used in semiconductor fabrication, e.g., layer deposition, photo-masking, etching, etc. For example, a component such as the waveguide 116 may be formed as a layer of materials with appropriate relative refractive indices so that light propagates through the waveguide in a manner similar to an optic fiber. The laser diode 112 and submount 114 may also be formed using integrated optics and/or integrated circuit manufacturing processes. However, in this representative example, the laser diode 112 and submount 114 are not formed together with the slider body 102 in the same layer deposition process. The laser diode 112 and submount 114 are formed separately and later attached together (e.g., using pick and place then solder reflow bonding) with the slider body 102 to form the LDU 106 of the slider assembly 100. The slider body 102, laser diode 112, and submount 114 have electrical connecting pads 120-122 that attach with other structures that are part of what is referred to as a head-gimbal assembly.

As discussed above, a HAMR drive uses a laser diode to heat the media to aid in the recording process. Due to inefficiencies of electric to optical power conversion, the laser diode also heats itself during lasing. Components (writer, reader, heat elements) in the magnetic slider also dissipate heat and the heat is conducted to laser diode as the laser diode submount is mounted on the slider. These components (including the laser diode) can experience significant heating due to light absorption and electric-to-optical conversion inefficiencies as energy produced by the laser diode is delivered to the magnetic recording medium (not shown). During write operation, for example, these light absorption and inefficiencies will vary the junction temperature of the laser diode, causing a shift in laser emission wavelength, leading to a change of optical feedback from optical path in slider to the cavity of the laser diode, a phenomenon that is known to lead to mode hopping/power instability of the laser diode.

Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Some of the physical mechanisms for thermally-induced mode hopping are thought to be temperature dependence of laser gain, index of refraction, and cavity length. Mode hopping is problematic for HAMR applications, as mode hopping leads to laser output power jumping and magnetic transition shifting from one block of data to another. Large transition shifts in a block of data may not be recoverable by channel decoding, resulting in error bits.

Embodiments of the disclosure are directed to apparatuses that provide for an increase in thermal conduction (e.g., a reduction in thermal resistance) between the submount and the slider, resulting in lower laser diode temperature excursions and a reduced likelihood of mode hopping. Embodiments of the disclosure are directed to apparatuses that provide for an increase in thermal conduction between the submount, the slider, and a suspension of a head gimbal assembly (HGA), resulting in lower laser diode temperature variations and a reduced likelihood of mode hopping. Embodiments that provide for increased thermal conduction (i.e. reduced thermal resistance) between the submount, the slider body, and/or HGA suspension facilitate an increase in service life of the laser diode, increased efficiency due to reduced operating temperatures, and increased stability and reliability of the laser diode during write operations (e.g., a reduced likelihood of mode hopping).

Figure 2A:
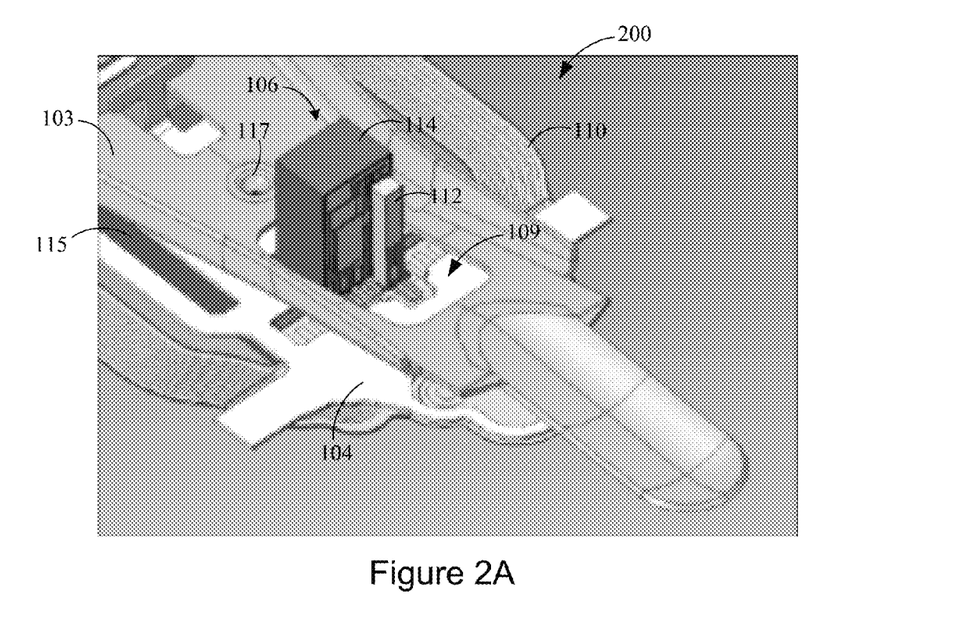
FIG. 2A is a top perspective view of a distal portion of a head gimbal assembly that includes a slider and laser diode unit supported by a suspension in accordance with embodiments of the disclosure.
Figure 2B:
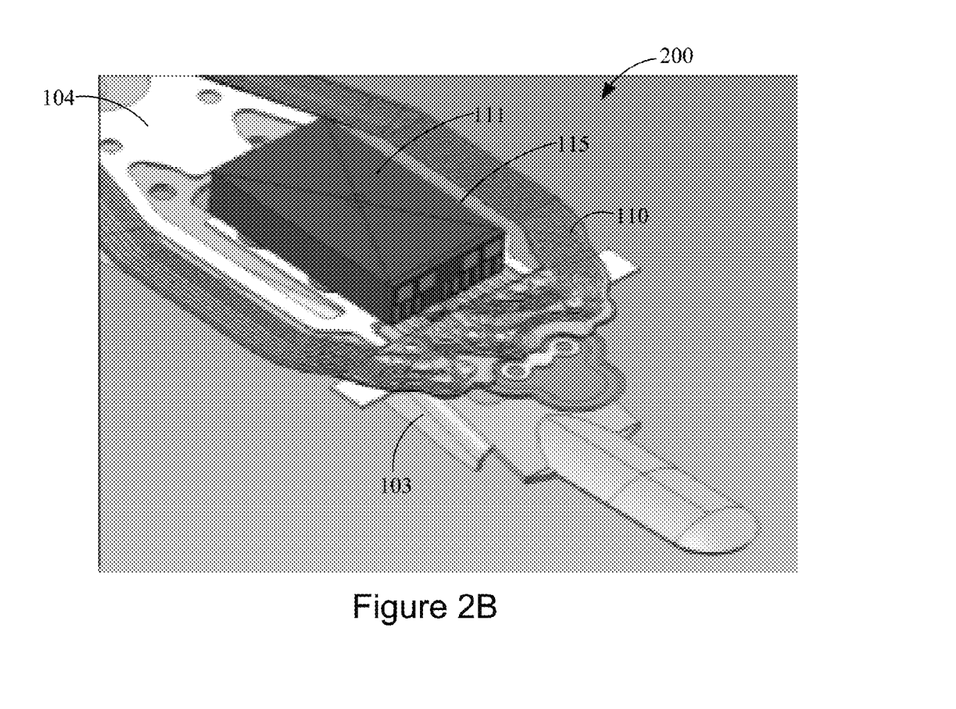
FIG. 2B is a bottom perspective view of the head gimbal assembly shown in FIG. 2A.

FIG. 2A is a top perspective view of a head gimbal assembly 200 that includes a slider 115 and laser diode unit 106 supported by a suspension 104 in accordance with embodiments of the disclosure. FIG. 2B is a bottom perspective view of the portion of the head gimbal assembly 200 shown in FIG. 2A. In the embodiment shown in FIGS. 2A and 2B, the suspension 104 is connected to a load beam 103 of the hard drive's actuator assembly. The slider 115 is best seen in the bottom perspective view of FIG. 2B, with the air bearing surface 111 defining the lower surface of the slider 115. The slider 115 is mounted to the suspension 104 which is connected to the load beam 103 at a single connection point 117, such as at a dimple connection. The single connection point 117 allows the slider 115 to articulate along multiple axes, such as a pitch axis and a roll axis, during operation. The load beam 103 includes an aperture 109 through which the LDU 106 protrudes, which allows for free movement of the LDU 106 as the suspension 104 is subject to aerodynamic forces and displacement during operation. A flex circuit arrangement 110 provides electrical connectivity between electrical contact pads of the slider 115 and various electronics of the hard drive.

As was discussed previously, in a heat-assisted magnetic recording system, a laser beam is used as a heating source to heat the magnetic recording medium to above its Curie temperature. To deliver the laser beam to a relatively small area (on the order of 20-50 nm) of the medium, a near field transducer (NFT) is used. During heat-assisted magnetic recording, the NFT absorbs laser energy, causing an increase in NFT temperature to an elevated temperature, leading to the deformation and recession of the peg region of the NFT. To reduce the peg temperature, different heat sink structures inside the slider have been proposed. However, other components, e.g., write pole, write coil, write return poles, heat sink, write core, and cladding layer, also absorb laser energy, causing a temperature increase of the entire slider. Currently, the slider is bonded to the suspension with epoxy. Due to the low thermal conductivity of the epoxy, laser heating causes high temperatures in the slider which cannot be readily dissipated.

Experimentation has revealed that as slider temperature increases with increasing laser current, a knee in the current curve is reached at a particular temperature (e.g., to about 103° C. in one experiment). At the knee in the laser current curve, the laser stops lasing if no additional cooling is applied to the slider. The high temperature of the slider was found to reduce the temperature difference between the peg and surrounding materials, and therefore the cooling efficiency of the peg. Also, high slider temperature can cause laser instability and damage to the laser source.

Embodiments of the disclosure are directed to a HAMR apparatus with high thermal dissipation that can maintain the LDU at a relatively constant temperature so that the LDU has better reliability and reduced laser instability issues. According to some embodiments, to reduce the slider and/or LDU temperature, the LDU is thermally connected to the slider and, in some embodiments, the slider is thermally connected to the suspension and HGA by a metallic solder or a thermally conductive epoxy or polymer to dissipate heat from the LDU to the slider and from the slider to the suspension, HGA, and other components of the head. To improve solder wetting and improve thermal dissipation, at least one of the slider/LDU surfaces is coated with a metallization layer, such as one or more metal films, according to some embodiments. To further increase thermal conductivity of the apparatus, the suspension can be made of a metal with high conductivity or the suspension surface and part of the slider surface can be coated with metal having high thermal conductivity.

Figure 3:
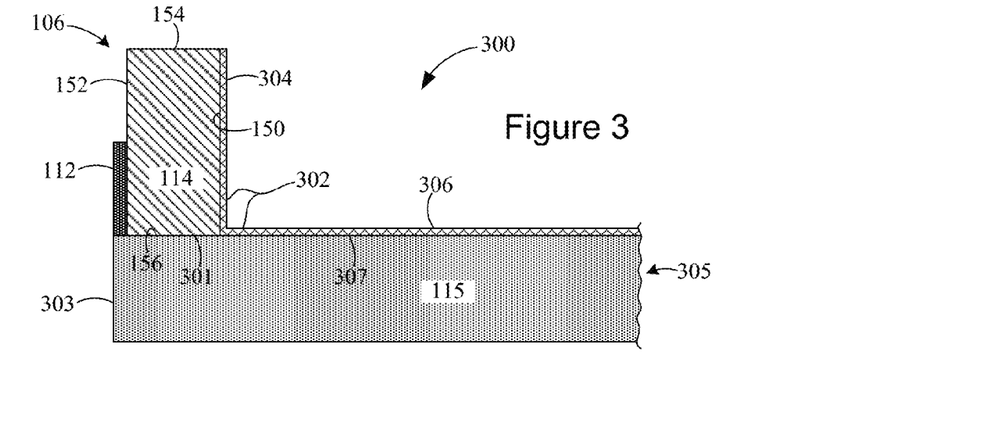
FIG. 3 illustrates a slider assembly configured to provide enhanced thermal conduction between a laser diode unit and a slider in accordance with various embodiments.

Turning now to FIG. 3, there is illustrated embodiment of a slider assembly 300 configured to provide enhanced thermal conduction between an LDU 106 and a slider 115 in accordance with various embodiments. The slider 115 has a trailing edge 303 and a leading edge 305. The LDU 106 comprises a submount 114 and a laser diode 112 mounted to the submount 114. The submount 114 includes a mounting surface 156 shown affixed to a first surface 301 of the slider 115 at the trailing edge 303 of the slider 115. In the configuration shown in FIG. 3, at least a portion of the submount 114 and a portion of the slider 115 are covered with a thermally conductive material 302 to provide enhanced thermal conduction between the laser diode 112, the submount 114, and the slider 115. The thermally conductive material 302 can be a continuous or discontinuous structure formed by a single or multiple layers of thermally conductive material (e.g., metal films of the same or different material). For purposes of explanation, portions of the thermally conductive material 302 are designated using different reference numbers typically associated with a different component surfaces. The thermally conductive material can included one or more of Al, Cu, Ag, Au, W, Cr, Mo, Zr, and Ti, and alloys thereof.

Figure 4:
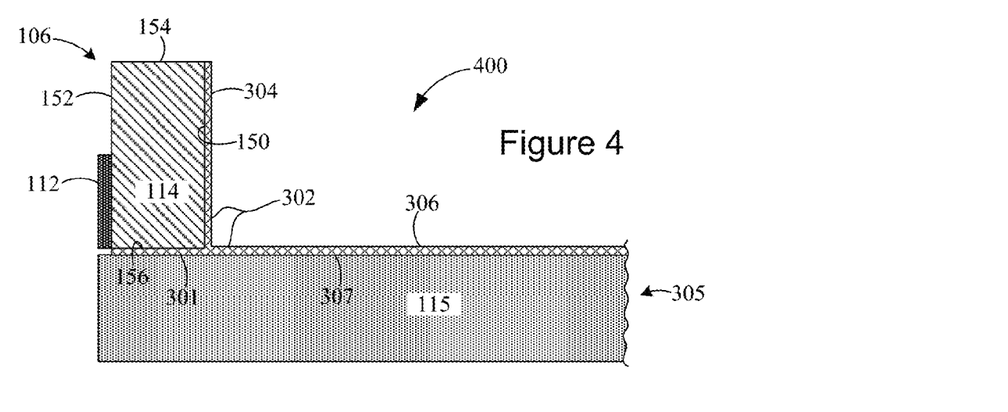
FIG. 4 illustrates a slider assembly configured to provide enhanced thermal conduction between a laser diode unit and a slider in accordance with other embodiments.
Figure 5:
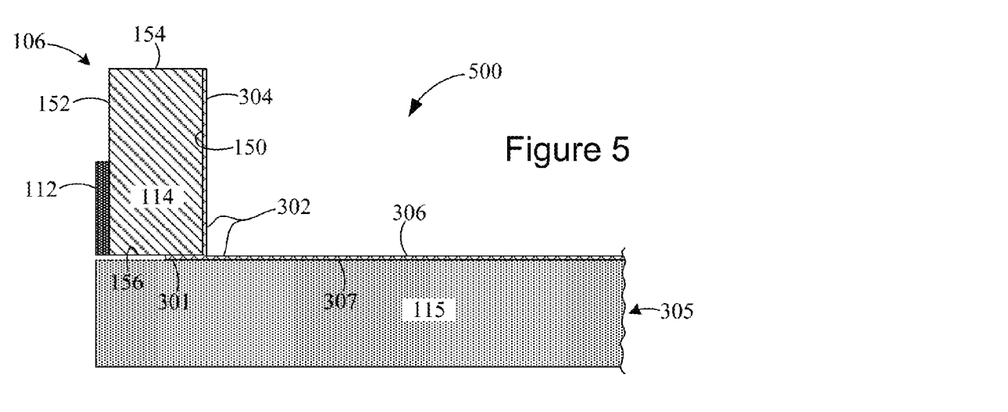
FIG. 5 illustrates a slider assembly configured to provide enhanced thermal conduction between a laser diode unit and a slider in accordance with further embodiments.
Figures 6, 6A:
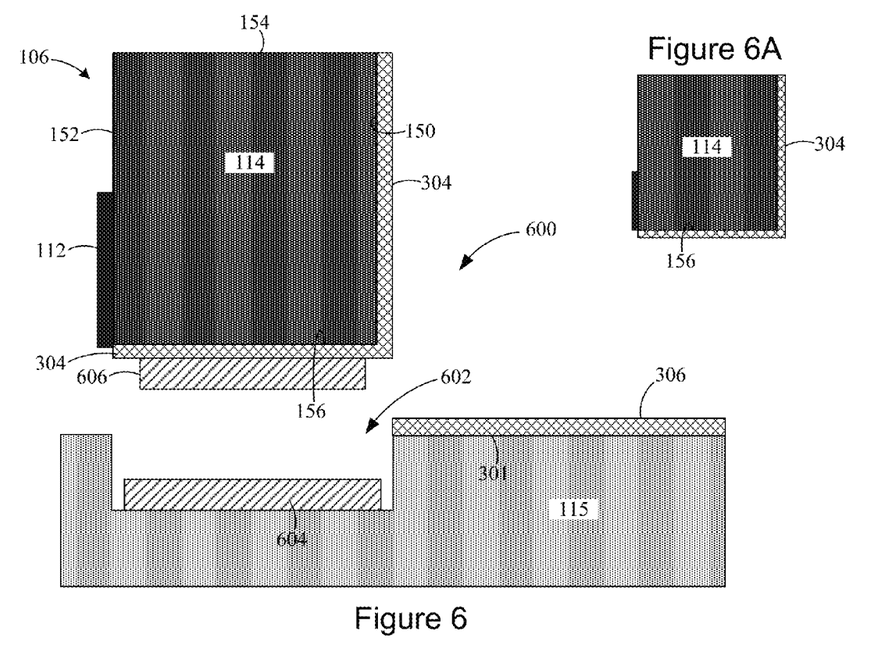
FIGS. 6, 6A, and 7 illustrate various thermal conduction features provided on a laser diode unit and the slider of a slider assembly in accordance with embodiments of the disclosure.
Figure 7:
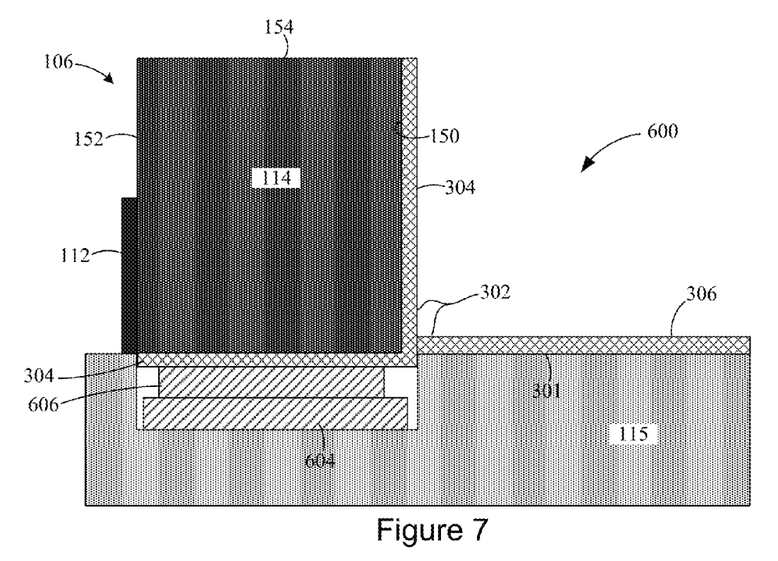

As is shown in FIG. 3, the submount 114 includes a first surface 150 that faces toward the leading edge 305 of the slider 115. A thermally conductive material 304 covers the first surface 150 of the submount 115 and the same or a different thermally conductive material 306 covers at least a portion 307 of the first surface 301 of the slider 115. In some embodiments, the thermally conductive material 306 covering the first surface 301 of the slider 115 extends from the submount 114 toward the leading edge 305 by a distance of about 200 µm to about 350 µm, and can have a thickness of between about 1 and 100 µm, and more preferably between about 5 to 20 µm. In some embodiments, at the region of the slider 115 adjacent the mounting surface 156 of the submount 114, the thickness of the thermally conductive material 306 can be much thinner to serve only as a wetting layer. In this case, the thickness of the thermally conductive material 306 that contacts the mounting surface 156 of the submount 112 can be between about 50 nm to 5 µm, and more preferably between 100 nm to 1 µm. It is noted that that one or more surfaces of the slider 115 adjacent the submount 114 can be processed to include an anti-reflective coating (not shown). It is also noted that solder layer features between the LDU 106 and the slider 115 are excluded from FIGS. 3-5 for simplicity of illustration, but are shown in FIGS. 6 and 7. It is further noted that a wetting layer can be provided on the portion 307 of the first surface 301 of the slider 115 onto which the thermally conductive material 306 is to be deposited.

The thermally conductive material 302 serves as a thermal conduction pathway between the submount 114 and the slider 115. In some embodiments, such as the slider assemblies 400 and 500 shown in FIGS. 4 and 5, respectively, thermally conductive material 302/306 covers some or all of the mounting surface 156 of the submount 114. It is noted that in FIGS. 4 and 5, the mounting surface 156 of the submount 114 is shown separated from the slider 115 by a gap, which is provided for simplicity of illustration. In actuality, the mounting surface 156 of the submount 114 is positioned on the slider 115 so that electrical connections can be established between electrical contacts and pads of the LDU 106 and those of the slider 115 (see, e.g., FIGS. 2A and 2B).

In some embodiments, the submount 114 includes six exterior surfaces including the mounting surface 156, the first surface 150, and four other surfaces including a second surface 152, an upper surface 154, and two opposing side surfaces (not shown). According to some embodiments, at least one of the exterior surfaces of the submount 114 includes the thermally conductive material 302. In other embodiments, at least two of the exterior surfaces of the submount 114 include the thermally conductive material 302. In further embodiments, at least three of the exterior surfaces of the submount 114 include the thermally conductive material 302. In some embodiments, at least four of the exterior surfaces of the submount 114 include the thermally conductive material 302. In still other embodiments, at least five of the exterior surfaces of the submount 114 include the thermally conductive material 306. According to some embodiments, all six of the exterior surfaces of the submount 114 include a thermally conductive material 302. In embodiments where the second surface 152 of the submount 114 includes the thermally conductive material 302, care is taken so as not to cover the electrical features (e.g., traces, contacts, pads) on the second surface 152 associated with the laser diode 112.

The thermally conductive material 302 can be deposited to the various component surfaces using various known vapor deposition and electrochemical techniques, such as sputtering, evaporation, electroplating, plating, chemical vapor deposition, and laser ablation, for example. In some embodiments, a mask is designed to cover the surface of the LDU 106 that includes the laser diode 112, and the entire LDU 106 is subsequently coated with the thermally conductive material 302 such as by sputtering, evaporation or plating. In such embodiments, the laser diode side of the LDU 106 is either not coated or selectively coated with the thermally conductive material 302. In other embodiments, surfaces of the laser diode 112 can be coated with a thermally conductive material, such as Au, then affixed to the second surface 152 of the submount 114 by solder. The second surface 152 can also be coated with Au (or other thermally conductive material), but with the use of a mask to prevent formation of electrical shorts. Coating the second surface 152 of the submount 114 with Au or other thermally conductive material provides an efficient thermal conductor to be formed over the SiO layer on the second surface 152 which acts as a thermal insulator.

In further embodiments, a multiplicity of surfaces (e.g., 2, 3, 4, 5, or 6 surfaces) of the submount 114 and the slider 115 are coated with the thermally conductive material 302. Machining can be used to remove the material 302 on selected surfaces or portions of surfaces of the submount 114 and the slider 115. For example, a mask can be designed to cover the slider's air bearing surface 111 and the surface of the slider 115 that faces the laser diode 120 to prevent shorting. With the mask in place, the thermally conductive material 302 can be deposited on the mask and the slider 115. In such embodiments, all the surfaces of the slider 115 except for the ABS 111 and the surface facing the laser diode 112 are covered with the thermally conductive material 302.

FIGS. 6 and 7 illustrate various thermal conduction features provided on a laser diode unit 114 and the slider 115 of a slider assembly 600 in accordance with embodiments of the disclosure. The slider 115 includes a first metal layer 604 provided in a trench 602 of the slider 115. At least a portion of the first surface 301 of the slider 115 is covered with a thermally conductive material 306. The trench 602 is dimension to receive the LDU 106. As shown, thermally conductive material 304 is disposed on the mounting surface 156 of the submount 114. The LDU 106 includes a second metal layer 606 disposed on the thermally conductive material 304 at the mounting surface 156. The first and second metal layers 604 and 606 can be under bump metallization (UBM or UBM/solder) layers, for example. In the embodiment shown in FIG. 6, at least the first surface 150 of the LDU 106 and the mounting surface 156 are covered entirely or at least partially by a thermally conductive material 304.

In some embodiments, such as that shown in FIG. 6A, the LDU 106 may exclude the second metal layer 606, such that the thermally conductive material 304 directly covers the mounting surface 156 of the LDU 106. According to some embodiments, the two opposing side surfaces (not shown in the cross-sectional view of FIG. 6) and the upper surface 154 can also include thermally conductive material 304. In further embodiments, all exterior surfaces of the LDU 106 include thermally conductive material 304, including the second surface 152 in selected locations so as not to cause shorting of the electrical traces and contacts disposed on the second surface 152.

FIG. 7 shows the LDU 106 of FIG. 6 affixed within the trench 602 of the slider 115. The LDU 106 is preferably soldered into place within the trench 602 of the slider 115. The thermally conductive material 304 can serve as a wetting layer for the solder connection between the LDU 106 and slider 115. With the LDU 106 affixed to the slider 115 as shown in FIG. 7, the thermally conductive material 304 disposed on the LDU 106 contacts the thermally conductive material 306 on the first surface 301 of the slider 115 to define a thermal conduction pathway (shows as thermally conductive material 302) between the submount 114 and the slider 115.

According to other embodiments, and with continued reference to FIGS. 6 and 7, the body of the laser diode 112 can be coated with thermally conductive material 304 (e.g., metal layers with high thermal conductivity) and the body of the laser diode 112 can be attached to the submount 114 via solder or thermally conductive epoxy to ensure that the laser diode 112 has good thermal conductivity with submount 114. In further embodiments, the first surface 150 of the submount 114, the slider 115, and the strut in the suspension (e.g., which connects the slider 115 to the suspension, see e.g., FIGS. 8-11) is coated with one or more metal films with high thermal conductivity, containing at least one of Au, Ag, Mo, W, Cu, Al, and Ti, and alloys thereof, and then the submount is joined with the strut using solder. Heat generated from the laser diode 112 will be conducted away to the suspension from the submount and the slider via the thermal conduction pathways between the laser diode 112 and submount 114, between the submount 114 and the slider 115, and between the slider 115 and the suspension. In another embodiment, the entire suspension can be coated with one or more metal layers with high thermal conductivity to enhance thermal conduction and heat dissipation.

Various embodiments are directed to reducing slider temperature by increasing thermal conduction between the slider and the suspension that supports the slider. Increasing thermal conduction between the slider and the suspension can be enhanced by implementing a thermal conduction pathway between the LDU and slider in a manner previously described in addition to a thermal conduction pathway between the slider and the suspension. According to various embodiments, to reduce the LDU and slider temperature, the LDU is thermally connected to the slider and the slider is thermally connected to the suspension and HGA by a metallic solder or thermal conductive polymer (e.g., thermally conductive epoxy) at the connection point (e.g., dimple 117 shown in FIG. 2A) to dissipate heat from the LDU to the slider and from the slider to the suspension, HGA, and other components of the head. To further increase the thermal conductivity, the suspension can be made of a metal with high conductivity or the suspension surface and part of the slider surface can be coated with metal having high thermal conductivity according to some embodiments.

Figure 8:
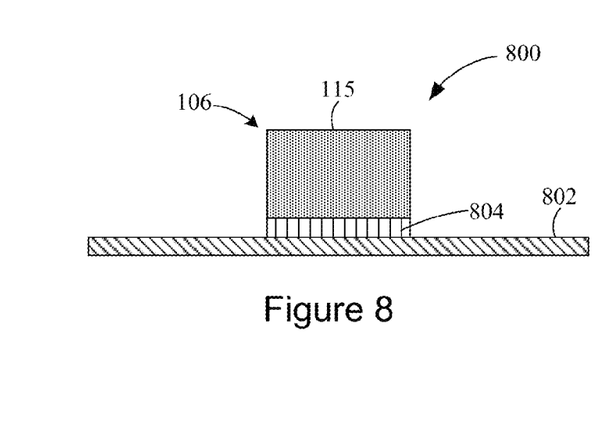
FIG. 8 illustrates a suspension assembly configured to provide enhanced thermal conduction between a slider supporting a laser diode unit and a suspension in accordance with various embodiments.
Figure 9:
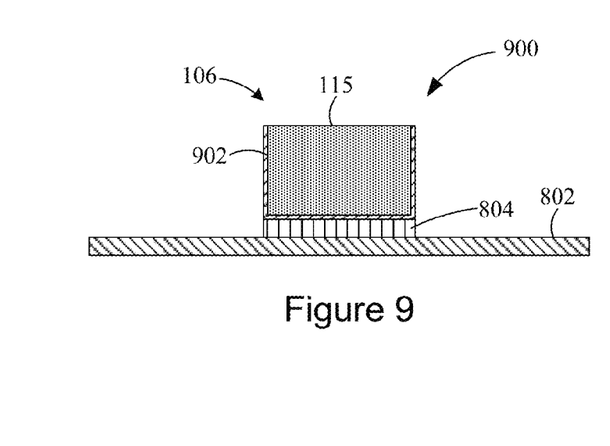
FIG. 9 illustrates a suspension assembly configured to provide enhanced thermal conduction between a slider supporting a laser diode unit and a suspension in accordance with some embodiments.

In one embodiment, and with reference to FIG. 8, the LDU 106 (not shown for simplicity in FIGS. 8-11, but shown in other Figures) is bonded to the slider 115, and the slider 115 is bonded to the suspension 802 with a thermally conductive bonding material 804. The thermally conductive bonding material 804 can be a metallic solder, grease/epoxy or polymer with high thermal conductivity. To improve wetting of the solder at the suspension/slider connection, and as shown in FIG. 9, the bottom and/or the side surface(s) of the slider 115 can be coated with one or more metal layers 902 preferably having high thermal conductivity. To further increase the dissipation of the heat from the LDU 106 to the slider 115 and from the slider 115 to the suspension 802, the one or more metal layers 902 can include one or more of Al, Cu, Ag, Au, W, Cr, Mo, Zr, and Ti, and alloys thereof. It is noted that the addition of thermally conductive material, such as one or more metal layers, to the LDU/slider/suspension arrangement is expected to increase the surface area of these components for enhanced heat dissipation.

The solder, high thermal conductive grease/epoxy or polymer (or other form of thermally conductive bonding material 804) is preferably thin enough so as not to adversely affect the fly-ability of the slider 115. It is preferred that, for solder embodiments, the solder is an alloy having low melting point of below 400° C., and more preferably below 225° C., to prevent reader damage. It is preferred that the solder contains at least one of the following elements or alloys thereof: Sn, In, Pb, Bi, Cd, Au, Cu, Ag. It is more preferable that the solder is an alloy of Ag, Cu, Au, or Sn. If the solder has a melting point above 250° C., it is preferred that the solder is melted using laser, electron beam or other localized heating method. If a thermally conductive epoxy or polymer is used, it is preferred that the epoxy or polymer contain one or more of the following metal elements or alloys thereof: Ag, Sn, In, Au, Cu. The metal elements can be introduced into the epoxy or polymer as metallic particles.

Figure 10:
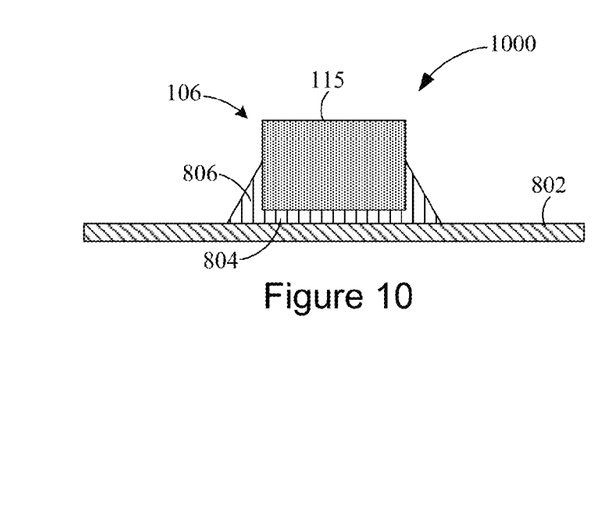
FIG. 10 illustrates a suspension assembly configured to provide enhanced thermal conduction between a slider supporting a laser diode unit and a suspension in accordance with other embodiments.

In another embodiment, and with reference to FIG. 10, thermally conductive material 804, such as solder, high thermally conductive epoxy or polymer, can cover all or a portion of the side wall of the slider 115 to further increase the thermal conductivity from the LDU 106 to the slider 115 and from the slider 115 to the suspension 802. For example, and as shown in FIG. 10, a wedge 806 of thermally conductive bonding material 804 can be built up along the peripheral wall of the slider 115. The lower surface of the wedge 806 and the adjacent material 804 under the slider 115 can provide thermally conductive bonding between the slider 115 and the suspension 802. It is noted that the embodiment shown in FIG. 10 can include the slider 115 coated with one or more metal layers 902 (as shown in FIG. 9).

Figure 11:
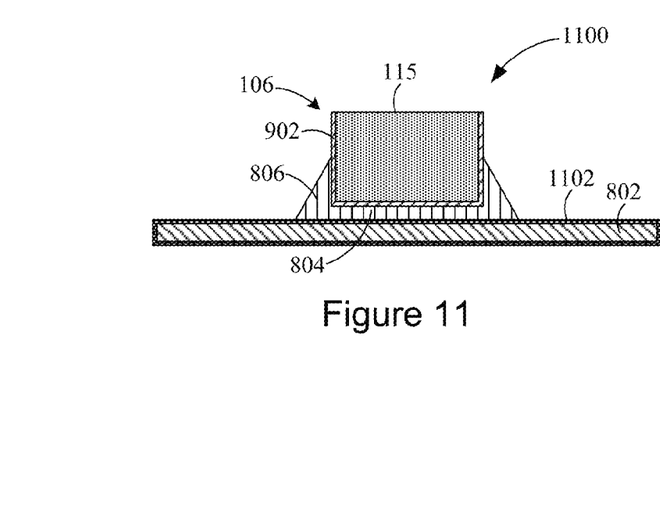
FIG. 11 illustrates a suspension assembly configured to provide enhanced thermal conduction between a slider supporting a laser diode unit and a suspension in accordance with further embodiments.

To further increase the thermal conductivity of the suspension 802, and in accordance with the embodiment shown in FIG. 11, the suspension 802 can be made of metallic materials with high thermal conductivity (e.g., relative to stainless steel) or one to four surfaces of the suspension 802 can be coated with metal coatings 1102 with high thermal conductivity (e.g., relative to stainless steel), such as Al, Ti, Cu, Au, Ag, W, Mo, Zr. The embodiment shown in FIG. 11 can optionally include the slider 115 coated with one or more metal layers 902 (as also shown in FIG. 9).

Figure 12:
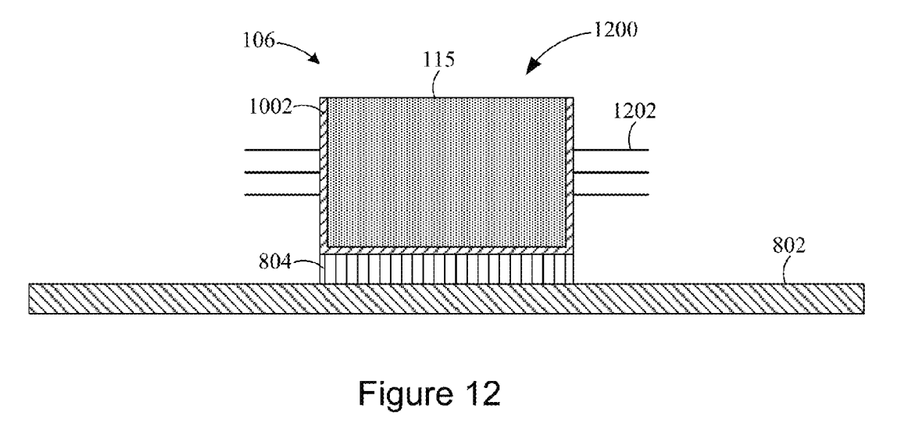
FIG. 12 illustrates a suspension assembly configured to provide enhanced thermal conduction between a slider supporting a laser diode unit and a suspension, the slider comprising a heat sink arrangement in accordance with various embodiments.

According to another embodiment, and with reference to FIG. 12, the slider 115 can include a heat sink 1202 to enhance heat dissipation. A heat sink 1202 (e.g., an array of cooling fins) made of high thermal conductivity metals can be added to the surface of the slider 115 to increase surface dissipation area to further dissipate heat from the LDU 106/slider 115. In some arrangements, a heat sink 1202 can be provided at two external surfaces of the slider 115. In other arrangements, a heat sink 1202 can be provided at three, four or five external surfaces of the slider 115. The heat sink 1202 can be made of at least one of the follow elements: Al, Cu, Au, Ag, W, Mo, Ti, and Zr, and alloys thereof.

To increase the heat dissipation of the laser source, it is important that the laser source has good thermal conduction with the submount and the submount has good thermal conduction with the slider. As was previously discussed with reference to FIGS. 3-7, the surface of the submount can be coated with one or more metal layers with high thermal conductivity. According to some embodiments, and with continued reference to FIG. 12, the metal layer(s) on the submount are directly connected with the metal layer(s) 1002 or other thermally conductive material (e.g., solder or high thermal conductive epoxy) provided on the surface of the slider 115.

Figure 13:
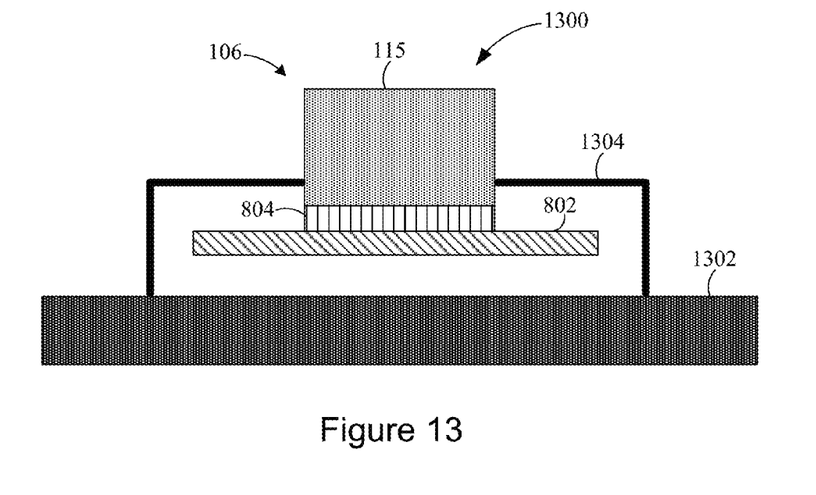
FIG. 13 illustrates a portion of a head gimbal assembly configured to provide enhanced thermal conduction between a slider supporting a laser diode unit and a load beam of the head gimbal assembly in accordance with various embodiments.

In another embodiment, and with reference to FIG. 13, the slider 115 is connected to the suspension 802 via thermally conductive bonding material 804, and the slider 115 is also thermally connected to the HGA 1302 (e.g., the load beam of the HGA) through a metal foil 1304. It is preferable that the metal foil 1304 is thin enough so that the foil 1304 will not adversely affect the fly-ability of the HGA assembly. The metal foil 1304 is expected to increase the surface area for heat dissipation and also conduct heat to the other components of the head. The metal foil 1304 can be formed from a variety of elements having a high thermal conductivity, such as Al, Ti, W, Mo, Au, Ag, and Cu, and alloys thereof. The metal foil 1304 can be attached to the slider 115 and the HGA 1302 by solder and/or a thermal conductive epoxy or polymer.

Figure 14:
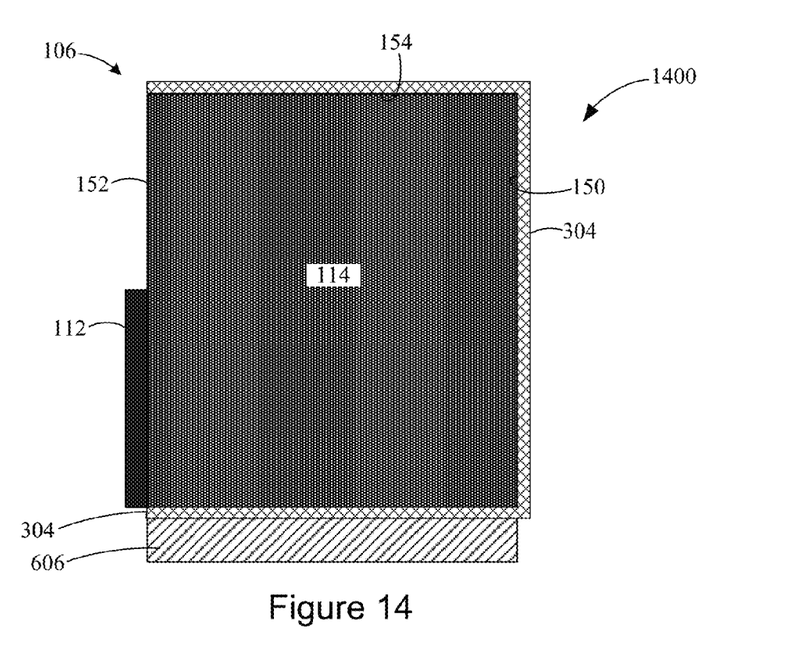
FIG. 14 illustrates a stand-alone laser diode unit that includes thermally conductive surface features configured to thermally cooperate with thermally conductive surface features of a separate slider onto which the laser diode unit can be mounted during manufacturing according to some embodiments.
Figure 15:
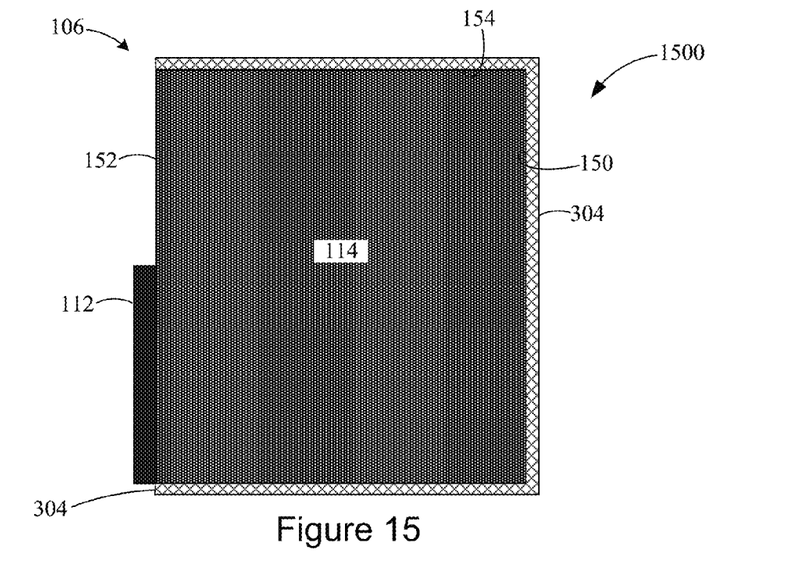
FIG. 15 illustrates a stand-alone laser diode unit that includes thermally conductive surface features configured to thermally cooperate with thermally conductive surface features of a separate slider onto which the laser diode unit can be mounted during manufacturing according to other embodiments.

FIGS. 14 and 15 illustrate embodiments of a stand-alone LDU 106 that includes thermally conductive surface features configured to thermally cooperate with thermally conductive surface features of a separate slider onto which the LDU 106 can be mounted during slider assembly. The LDU 106 shown in FIGS. 14 and 15 is considered a stand-alone product that can be fabricated, shipped, and then installed onto a slider by a hard drive (or component thereof) manufacturer. The embodiment of the LDU 106 shown in FIGS. 14 and 15 includes a laser diode 112 mounted to a second surface 152 of a submount 114. Thermally conductive material 304 (e.g., one or more metal layers or a thermally conductive polymer) is deposited on at least one exterior surface of the submount 114 that becomes thermally coupled to a slider when the LDU 106 is installed on the slider.

For example, at least the first surface 150 of the submount 114 can be covered by thermally conductive material 304 which becomes thermally coupled to the slider when the LDU 106 is installed onto the slider. By way of further example, at least the mounting surface 156 and the first surface 150 of the submount 114 can be covered by thermally conductive material 304 which becomes thermally coupled to the slider when the LDU 106 is installed onto the slider. In some embodiments, the submount 114 has six exterior surfaces including the first surface 150, the second surface 152, the mounting surface 156, a top surface 154, and a pair of opposing side surfaces (not shown in the cross-sectional view). In some embodiments, thermally conductive material 304 can cover some or all of the first surface 150, the mounting surface 156, the top surface 154, and the pair of opposing side surfaces. In other embodiments, thermally conductive material 304 can cover some or all of the first surface 150, the second surface 152 (with appropriate masking to avoid covering electrical features thereon), the mounting surface 156, the top surface 154, and the pair of opposing side surfaces.

The embodiments shown in FIGS. 14 and 15 share similar features, but differ in terms of features at the mounting surface 156 of the submount 114. In the embodiment shown in FIG. 14, thermally conductive material 304 is shown deposited on the mounting surface 156 of the submount 114, and a metal layer 606 (e.g., UBM or UBM/solder layer) is formed on the thermally conductive material 304 at the mounting surface 156. The thermally conductive material 304 disposed between the submount 114 and the metal layer 606 at the mounting surface 156 serves as a wetting layer for a solder connection to be established between the LDU 106 and the slider during LDU installation onto the slider. In the embodiment shown in FIG. 15, the mounting surface 156 of the submount 114 is devoid of a metal layer 606, such that the thermally conductive material 304 directly covers the mounting surface 156 of the submount 114. In this configuration, the thermally conductive material 304 directly covering the mounting surface 156 serves as both a thermal conductor and a wetting layer for a solder connection to be established between the LDU 106 and the slider during LDU installation onto the slider. Alternatively, a metal layer, such as a UBM or UBM/solder layer, can be formed on the thermally conductive material 304 at the mounting surface 156 at the time of LDU installation onto the slider.

Figure 16:
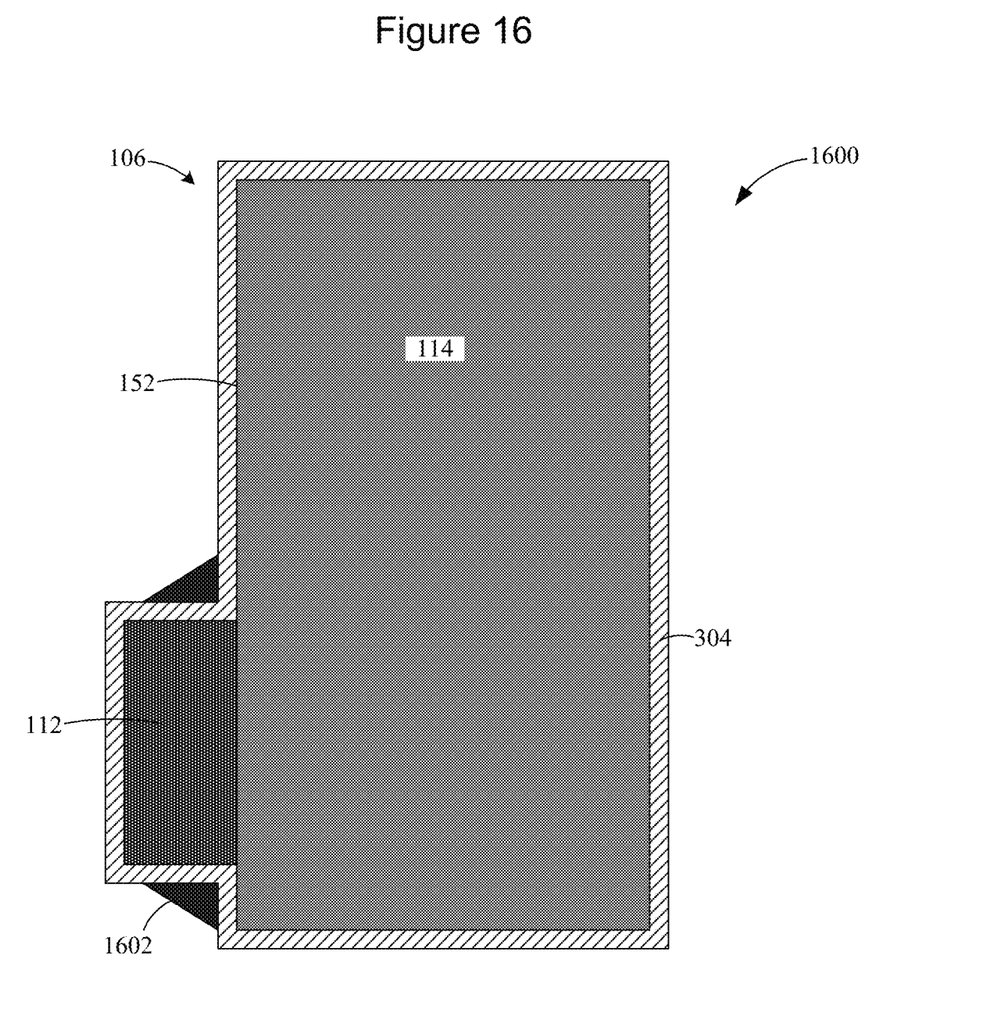
FIG. 16 illustrates a stand-alone laser diode unit that includes thermally conductive surface features between the laser diode and submount, and that thermally cooperate with thermally conductive surface features of a separate slider onto which the laser diode unit can be mounted during manufacturing according to other embodiments.

FIG. 16 illustrates a stand-alone laser diode unit 106 that includes thermally conductive surface features between the laser diode 112 and submount 114, and that thermally cooperate with thermally conductive surface features of a separate slider onto which the laser diode unit 106 can be mounted during manufacturing according to other embodiments. The LDU 106 shown in FIG. 16 is considered a stand-alone product that can be fabricated, shipped, and then installed onto a slider by a hard drive (or component thereof) manufacturer. The embodiment of the LDU 106 shown in FIG. 16 includes a laser diode 112 mounted to a second surface 152 of a submount 114. Thermally conductive material 304 (e.g., one or more metal layers or a thermally conductive polymer) is deposited on each of the exterior surfaces of the submount 114 and on each of the exterior surfaces of the laser diode 112, with appropriate masking or material removal being provided on the second surface 152 to avoid formation of electrical shorts associated with electrical traces and contacts on this surface (and those on the mounting surface of the laser diode 112). A layer or wedge of solder 1602 is shown formed between the laser diode 112 and the rear surface 152 of the submount 114. The solder 1602 serves as a thermal conductor between the laser diode 112 and the submount 114, thereby facilitating increased heat dissipation from the laser diode 112 to the thermally conductive material 304 on the submount 114. The solder 1602 also serves to strengthen the mechanical connection between the laser diode 112 and the submount 114.

Figure 17:
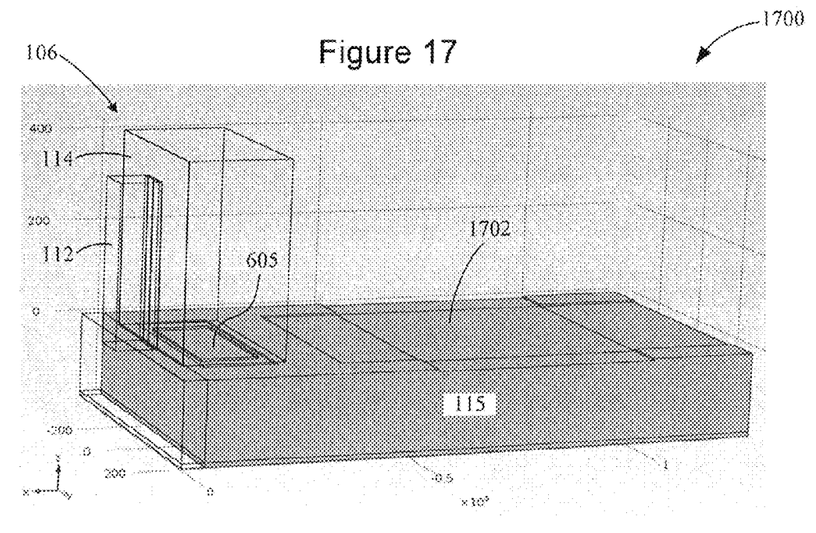
FIGS. 17 and 18 illustrate a slider assembly which incorporates various thermal conduction features provided on a slider of the slider assembly in accordance with embodiments of the disclosure.
Figure 18:
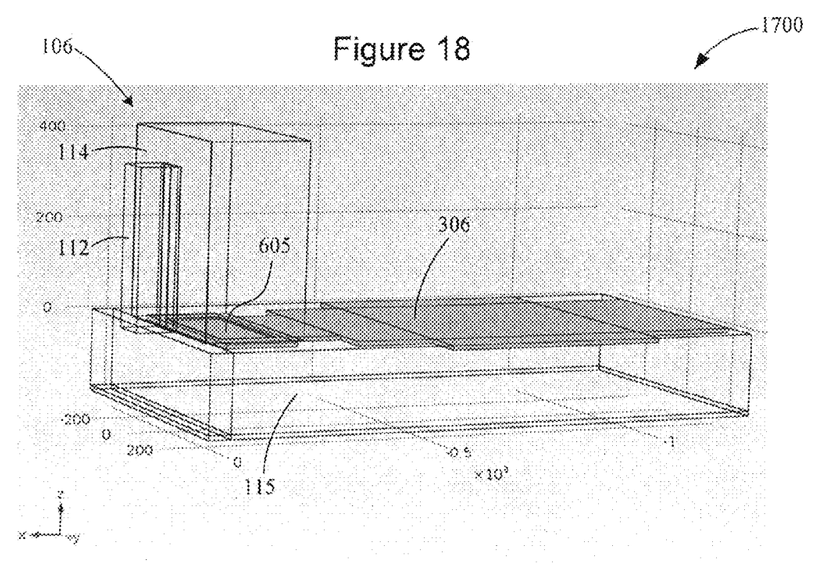

FIGS. 17 and 18 illustrate a slider assembly 1700 which incorporates various thermal conduction features provided on a slider 115 of the slider assembly 1700 in accordance with embodiments of the disclosure. The slider assembly 1700 shown in FIGS. 17 and 18 represents a computer construct on which modeling was performed to demonstrate the efficacy of various embodiments. According to a modeling exercise involving the slider assembly design shown in FIGS. 17 and 18, a region 1702 (FIG. 17) of the slider 115 has a mill depth of 4 μm over which a copper plate 306 (FIG. 18) is provided having a depth of 10 μm. The copper plate 306 (thermal conductivity k=400 W/mK) extends 6 μm underneath the UBM/solder 605 (4.68 μm) such that the top of the UBM/solder 605 is above the plane of the copper plate 306 to prevent direct contact between the submount 114 and the copper plate 306. In this illustrative exercise, the laser diode power is 0.1 W and the convective heat transfer coefficient at the air bearing of the slider 115 is $1\times10^4$ (W/m$^2$K).

In the case of the slider assembly 1700 lacking the copper plate 306 (see FIG. 17), a maximum temperature of 53.67° C. (ΔT=28.67° C.) for the slider assembly 1700 was experienced at the laser diode 112. In the case of the slider assembly 1700 including the copper plate 306 (see FIG. 18), a maximum temperature of 49.18° C. (ΔT=24.18° C.) for the slider assembly 1700 was experienced at the laser diode 112. It was found that inclusion of the copper plate 306 in the slider assembly design resulted in a 15.5% reduction of ΔT when compared to the same design lacking the copper plate 306.

The modeling exercise described above was repeated on the same slider assembly design, expect for the copper plate 306 having a thermal conductivity of k=200 W/mK instead of 400 W/mK. For this exercise, a maximum temperature of 50.32° C. (ΔT=25.32° C.) for the slider assembly 1700 was experienced at the laser diode 112. It was found that inclusion of the copper plate 306 with a thermal conductivity of k=200 W/mK instead of 400 W/mK resulted in an 11.6% reduction of ΔT when compared to the same design lacking the copper plate 306.

Embodiments of the present disclosure provide for reduced submount/slider and/or submount/slider/suspension interface temperatures for future slider arrangements that will require smaller (e.g., shorter in the vertical direction) submounts. Future hard disk drives will continue the trend of providing higher storage capacity in smaller (e.g., thinner) form factors. The vertical height of the submount has a bearing on the overall thickness of a disk drive. Shorter submounts can help to reduce overall drive thickness. However, modeling of smaller submount designs has demonstrated that next generation submounts are at near-uniform temperature, indicating that the slider arrangement is unable to efficiently remove energy from the submount to the slider body. Embodiments of the disclosure provide for increased transport of laser diode heat from the submount to the slider body and suspension by increasing thermal conduction between the submount, slider, and suspension for current and future disk drive designs.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a slider having a trailing edge and a leading edge;
   a laser diode unit comprising a submount and a laser diode mounted to the submount, the submount having a mounting surface affixed to a first surface of the slider near the trailing edge such that a first surface of the submount faces toward the leading edge of the slider; and
   a thermally conductive material covering the first surface of the submount and at least a portion of the first surface of the slider, the thermally conductive material serving as a thermal conduction pathway between the submount and the slider;

wherein:

a mounting interface is defined between the first surface of the slider and the mounting surface of the submount;

the first surface of the slider comprises a solder layer adjacent the mounting surface of the submount;

the mounting surface of the submount comprises a solder layer; and the thermally conductive material extends into the mounting interface.

2. The apparatus of claim 1, wherein the thermally conductive material covers some or all of the mounting surface of the submount.

3. The apparatus of claim 1, wherein a solder layer covers some or all of the thermally conductive material at the mounting surface.

4. The apparatus of claim 1, wherein:

the submount comprises a plurality of surfaces including the first surface, the mounting surface, and a plurality of other exterior surfaces; and the thermally conductive material covers some or all of at least three of the plurality of other exterior surfaces.

5. The apparatus of claim 1, further comprising:

a suspension configured to support the slider; and a thermally conductive bonding material disposed between the slider and the suspension, the thermally conductive bonding material serving as a thermal conduction pathway between the slider and the suspension.

6. The apparatus of claim 5, wherein the thermally conductive bonding material comprises a thermally conductive polymer.

7. The apparatus of claim 5, wherein the thermally conductive bonding material comprises a thermally conductive epoxy.

8. The apparatus of claim 5, wherein the thermally conductive bonding material comprises solder.

9. The apparatus of claim 5, wherein the suspension comprises a coating of metallic material having a high thermal conductivity relative to an underlying structure of the suspension.

10. The apparatus of claim 5, wherein the suspension is formed from a material having a high thermal conductivity relative to stainless steel.

11. The apparatus of claim 5, wherein:

the slider comprises an air bearing surface, side surfaces, and a contacting surface adjacent the suspension; and at least the contacting surface of the slider comprises a coating of metallic material having a high thermal conductivity.

12. The apparatus of claim 5, wherein:

the slider comprises an air bearing surface, side surfaces, and a contacting surface adjacent the suspension; and the contacting surface and a plurality of the side surfaces of the slider comprise a coating of metallic material having a high thermal conductivity.

13. The apparatus of claim 12, wherein the material covering the side surfaces of the slider forms a wedge-shaped structure between the slider and the suspension.

14. The apparatus of claim 5, wherein the suspension comprises a coating of metallic material having a high thermal conductivity relative to an underlying structure of the suspension.

15. The apparatus of claim 1, wherein:

the slider comprises a media-facing surface opposing the first surface of the slider; and the first surface of the submount is normal to the first surface of the slider.

16. An apparatus, comprising:

a submount configured to be soldered to a slider, the submount having a polygonal shape with exterior surfaces and a mounting surface configured to be attached to the slider via a solder connection;

a laser diode mounted on a first surface of the submount, the first surface comprising one or more electrical conductors for establishing electrical connections to the laser diode; and thermally conductive material covering a plurality of the exterior surfaces of the submount in addition to the mounting surface, the thermally conductive material covering the mounting surface of the submount serving as a wetting layer for the solder connection;

wherein the one or more electrical conductors are electrically isolated from the thermally conductive material to prevent shorting of the one or more electrical conductors.

17. The apparatus of claim 16, wherein the thermally conductive material covers a second surface of the submount opposing the first surface.

18. The apparatus of claim 16, wherein the thermally conductive material covers at least three surfaces of the submount.

19. The apparatus of claim 16, wherein the thermally conductive material covers at least four surfaces of the submount.

20. The apparatus of claim 16, wherein the thermally conductive material covers at least five surfaces of the submount.

21. The apparatus of claim 16, wherein:

the thermally conductive material covers exterior surfaces of the submount and the laser diode; and a layer or wedge of solder thermally connects the exterior surfaces of the laser diode to thermally conductive material on the submount.

* * * * *